March 30, 1965 FREDERICK NETTEL ETAL 3,175,953
STEAM-COOLED NUCLEAR REACTOR POWER PLANT
Filed Feb. 27, 1962
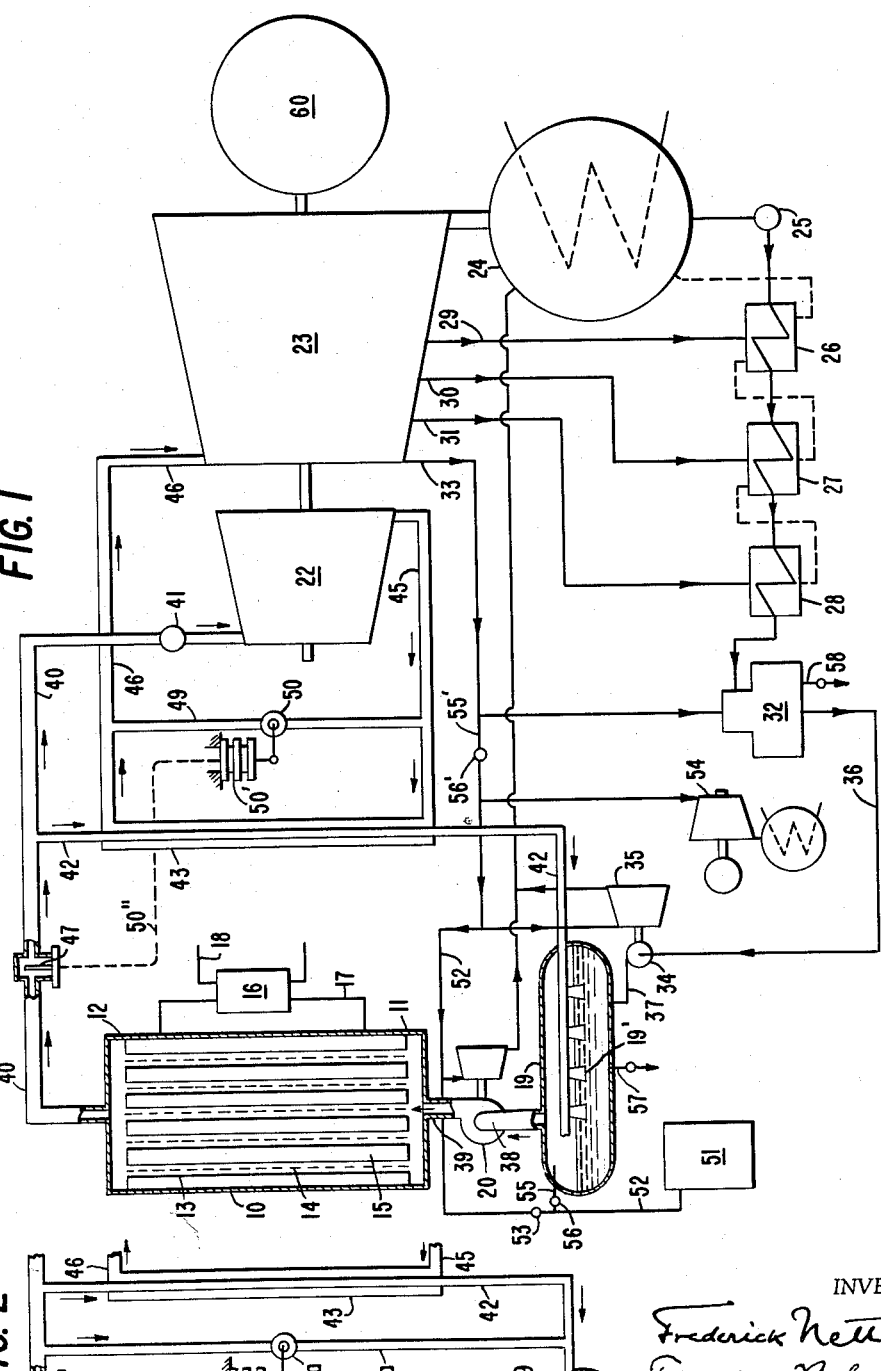
FIG. I
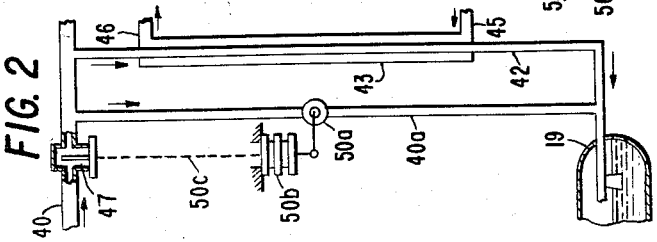
FIG. 2
INVENTOR
Frederick Nettel.
Tetsuichiro Nakanishi.

United States Patent Office 3,175,953
Patented Mar. 30, 1965

3,175,953
STEAM-COOLED NUCLEAR REACTOR
POWER PLANT
Frederick Nettel, 173 Chapel Road, Manhasset, Long
Island, N.Y., and Tetsuichiro Nakanishi, Tokyo, Japan
(173 Chapel Road, Manhasset, Long Island, N.Y.)
Filed Feb. 27, 1962, Ser. No. 176,010
2 Claims. (Cl. 176—60)

This invention deals with power plants using nuclear reactors for supplying steam to turbines producing useful power.

It is known to use the Loeffler boiler system in combination with nuclear reactors as heat source.

It is known to reheat steam at an intermediate stage of expansion in a turbine to prevent excessive moisture in said steam in the low pressure turbine stages by heat from fossil fuels and it has been also proposed to reheat the steam in nuclear reactors of special design. Obviously, the use of fossil fuel for reheating would destroy the main object of nuclear power plants, and the use of the reactor for reheating requires special design, which is only acceptable in plants of large capacities.

It is the principal object of this invention to eliminate or substantially reduce the aforementioned disadvantages in a simple and economic manner suitable also for plants of smaller outputs and to obtain regulatable reheat indirectly from nuclear heat. The foregoing and other objects, features and advantages from our invention will be apparent in the following specification and drawings which illustrates by way of non-limiting examples embodiments of the invention.

FIG. 1 of the drawing shows diagrammatically a steam power plant with a nuclear reactor as source of heat, producing superheated steam and regulation of the steam temperature at reactor outlet.

FIG. 2 illustrates a modification of the temperature control as per FIG. 1.

The principal object of this invention is achieved by producing high-pressure saturated steam by what is known as the Loeffler system, modified in that the saturated steam from an evaporator drum partly filled with water is superheated by leading it through passages containing nuclear fuel provided in a nuclear reactor, leading a first-part stream of the thus produced superheated steam into a steam turbine wherein it produces useful power, leading said first part-stream in counterflow heat-exchange relationship to a second part-stream of the superheated steam issuing from said reactor, for reheating said first part-stream and leading the said reheated steam back to said steam turbine for further expansion and subsequently into a condenser, to produce more useful power; leading the said second part-stream, after it has lost part of its superheat by reheating said first part-stream, back into said evaporator drum where it loses the remaining superheat and generates saturated steam from the condensate of said first-part-stream, and pumping said saturated steam back through the reactor for superheating it therein again, the steam flowing in two substantially closed parallel-flow circuits, one to serve the steam turbine, the other the reheater and the evaporator drum in that sequence.

Maintaining the steam temperature at reactor outlet at a predetermined value is of great importance for the following reasons:

Exceeding the temperature may cause damage to the fuel elements, entailing serious safety hazards. A reduction of temperature would lead to reduction of output of the reactor and consequently the turbine. An increase in temperature might also be brought about by a reduction in the output of the steam circulating pump, as well as an obstruction in the steam flow passages through the fuel elements.

Minor increases and decreases of the steam temperature may also be caused by fluctuating load demand, entailing cyclic heating and cooling of the fuel elements, which, if used under such circumstances, would reduce their useful life for mechanical reasons.

It would be basically possible to control temperature changes by adjusting the control rods ordinarily provided in reactors, or other equivalent means to regulate the heat output of the reactor. While this method is suitable for dealing with large and sustained load changes, it is not desirable to have control rods follow the small load fluctuations in normal reactor operation, because too frequent operation of the control rods reduces their life due to excessive neutron absorption.

It is, therefore, another object of this invention to control the amount of reheat of the steam to maintain consant steam temperature at the reactor outlet for normal and sustained load operation.

Reverting now in more detail to the FIG. 1 of drawing, in which 10 is the reactor vessel with steam headers 11 and 12 at the ends, the headers are connected by pressure tubes 13 which are externally and/or internally heat insulated and contain nuclear fuel elements 14. The spaces between the pressure tubes and the reactor wall are filled by a liquid moderator 15 which is connected to a moderator cooler 16 via pipe 17. Said cooler is supplied with a cooling medium via pipe 18 from a source not shown. 19 is an un-fired pressure vessel partly filled with water, 20 a steam pump driven by an auxiliary steam turbine 21. 22 is the high-pressure cylinder and 23 the low-pressure cylinder of the main steam turbine, 24 the main condenser, 25 its condensate pump. 26, 27 and 28 are regenerative feed-water heaters drawing steam from three pressure stages of the turbine through pipes 29, 30 and 31. 32 is a feedwater deaerator drawing steam through pipe 33 from the turbine 23. The high-pressure feedwater pump 34, driven by the auxiliary turbine 35, sucks preheated feedwater from the deaerator 32 through the pipe 36 and discharges it through the pipe 37 into the pressure vessel 19.

The upper part of the vessel 19 is connected by pipe 38 with the suction size of steam pump 20 while the pipe 39 connects the pressure outlet of said pump is connected by pipe 39 to the header 11. The header 12 is connected via the pipe 40 with valve 41 to the inlet of the high-pressure cylinder 22 of the main turbine. Branched-off from 40 is another pipe 42 which discharges into 19 via steam nozzles 19′ ending below the water level inside 19. 43 is a convection-type heat exchanger, which serves as steam reheater, whose heating side is interposed in the pipe 42. The outlet from the high-pressure cylinder 22 is connected via the pipe 45 with the reheated side of the reheater 43 as shown. Pipe 46 connects the upper end of the heated side of 43 with the low-pressure cylinder of the main turbine 23. Pipe 49 with valve 50 forms a direct connection between the pipes 45 and 46, by-passing the reheater.

51 is an auxiliary boiler fired by any conventional fuel, arranged to supply steam via the pipe 52 with valve 53 to the auxiliary turbines 21 and 35 and to the auxiliary turbogenerator set 54. A branch pipe 55 with valve 56 permits steam supply into 19 from boiler 51. The pipe 33 is further connected by pipe 55′, with valve 56′, to pipe 52. Valved drain pipes 57 and 58 are provided for 19, and 32, as shown. The condensate from the feedwater heaters 26, 27 and 28 is led into the condenser 24 as indicated by the dashed lines. 60 is a power consumer of any kind, for example an electric generator, mechanically coupled to the main turbines 22, 23.

The plant is started and operated as follows:

Valves 50, 53 and 56 are open while valves 41 and 46 are closed. Medium pressure steam is admitted from boiler 51 into the pressure vessel (evaporator drum) 19 and the auxiliary turbines 31 and 35, 19 is assumed about halfway filled with water. With the reactor 10 critical and pump 20 operating at low speed, steam is flowing from the vessel 19 through the fuel assemblies 14 in the reactor 10, absorbing nuclear heat thus cooling the reactor. The steam is superheated in 13 and flows through the pipes 40 and 42 back into 19 where it loses its superheat by contact with the water, thereby heating the latter. This continues for some time until the water in 19 has reached the saturation temperature of the steam supplied by the auxiliary boiler 51. Then the continued heat input into 19 causes some of the water therein to evaporate and the pressure in the closed path of the steam will tend to rise. At this time the valve 56 can be closed thus separating the vessel 19 from the boiler 51. The steam pressure in 19 will now rise quickly until a predetermined pressure has been reached. Now by opening the valve 41 superheated steam can flow from pipe 40 to the high-pressure inlet of the high pressure cylinder of the main turbine 22, expanding to an intermediate pressure, continuing via pipe 45 through pipe 49 with valve 50 and pipe 46 to enter the low-pressure cylinder 23 of the main turbine and thence into the condenser 24. The resulting condensate flows through condensate pump 25, the feedwater heaters 26, 27 and 28, the deaerator 32, the pipe 36 into the high-pressure boilerfeed pump 34, from where it returns via pipe 37 into 19.

After the main turbine begins to furnish power and the pressure in the extraction pipe 33 has reached a substantial value, the valve 53 can be closed while the valve 56' is opened, so that the main turbine can take over the steam supply to the auxiliary turbine 21 and turbine 35; the auxiliary boiler is now completely disconnected and may be shut down. Other auxiliaries, such as for example the auxiliary turbogenerator 54 can also be supplied with steam from the pipe 55'. By gradually closing the valve 50 steam from pipe 45 will partly flow through the convection type heat exchanger (reheater) 43, in counterflow to the highly superheated steam in pipe 42, thereby being reheated, before it enters the low-pressure cylinder 23. The steam from 42 enters 19, after having lost a portion of its superheat in 43, where it produces more saturated steam for the reactor.

When valve 50 is completely closed, all of the steam from pipe 45 is reheated in 43 by nuclear superheat, reducing steam moisture in 23 also for full load turbine operation to permissible limits.

If the temperature at the reactor outlet increase above a predetermined value, the temperature sensing device 47 operates a bellows 50' (or an equivalent device) via an impulse line 50''. The bellows 50' is connected to valve 50, opening it, thus permitting more steam to flow through the by-pass 49. By reducing the reheating in 43 the steam temperature at the entrance to 19 is increased causing more evaporation in 19 and increasing the steam flow through the reactor 10, thereby reducing the steam temperature in pipe 40 to a permissible value.

In FIG. 2 a modified pipe arrangement is illustrated for achieving temperature regulation. Pipe 40a, with valve 50a, forms a direct connection between the pipe 40 and the pressure vessel 19. If the temperature in 40 rises unduly, the sensor 47 opens the valve 50a via the impulse line 50c and bellows 50b, permitting more hot steam to enter 19 directly, and less to pass through the reheater 43, thus increasing steam production in 19 and consequently reducing the steam temperature in 40 to normal.

It is immaterial for the purposes of this invention what particular type of steam-cooled reactor is employed, what fissionable fuel is used in the reactor, whether or not it is moderated, what moderator and what kind of regulation is employed. It is further immaterial what particular type of steam turbine is utilized on one or more shafts and what kind of power consumer or consumers it drives, at constant or variable speeds. It is also within the scope of this invention to use more than one stage of reheating. Instead of nozzles 19' in 19, water may be sprayed into 19 to ensure good contact with the steam to be condensed by it.

Having now described and illustrated our invention, we wish it to be understood that our invention is not limited to the specific forms and arrangements of parts herein described and shown, or specifically covered by our claims:

We claim:

1. In combination a steam-cooled nuclear reactor for producing high-pressure superheated steam, a multi-stage steam turbine constructed to partially expand high-pressure steam which is reheated and then further expanded for production of useful power, a steam condenser connected to said turbine, said reactor having nuclear fuel assemblies and tubular passage means forming part of and in heat exchange relationship with said fuel assemblies, said tubular passage means receiving high-pressure saturated steam, a closed pressure vessel disposed outside of said reactor, said vessel being partly filled with water, first conduit means connecting said pressure vessel with the inlets to said tubular passages, second conduit means connecting the outlets of said tubular passages with said pressure vessel, thus forming a closed circuit path through said tubular passages and back to the said closed vessel, a steam pump interposed in said conduit means, a motor disposed to drive said pump, said pump regulatably moving saturated steam from said closed vessel through said tubular passage means and back to said vessel, thus transferring nuclear heat from the fuel assemblies to the saturated steam, the resulting superheated steam being desuperheated on re-entry to said vessel by contact with the water in said vessel, thereby evaporating some of the water in said vessel, third conduit means branching off superheated steam from said second conduit means and connecting it to the high-pressure inlet of said steam turbine, fourth conduit means connecting a first intermediate pressure stage of said turbine leading the partly expanded steam to re-enter said turbine at an intermediate turbine stage of lower pressure than said first intermediate stage for further expanson in the turbine, convection-type heat exchanger means interposed on the heating side in said second conduit means at a point between the outlets from the tubular passages of the reactor and the inlet to said pressure vessel, the heated side of said heat exchanger being interposed in said third conduit means for reheating the steam issuing from the first intermediate turbine stage by the superheated steam, thereby reducing partly the superheat of the steam in the second conduit means before it enters the pressure vessel, fifth conduit means with interposed pumping means leading the condensate from the condenser back into said pressure vessel, sixth valved conduit means by-passing the heated side of said heat exchanger for regulating the quantity of steam being reheated in said heat exchanger, temperature sensing means in said second conduit means interposed in said second conduit means at a point near the outlets from said tubular passages and means for controlling the valve in said sixth conduit means in response to changes in the steam temperature in said second conduit means indicated by the said temperature sensing means.

2. In combination a steam-cooled nuclear reactor for producing high-pressure superheated steam, a multi-stage steam turbine constructed to partially expand high-pressure steam which is reheated and then further expanded for production of useful power, a steam condenser connected to said turbine, said reactor having nuclear fuel assemblies and tubular passage means forming part of and in heat exchange relationship with said fuel assemblies, said tubular passage means receiving high-pressure saturated steam, a closed pressure vessel disposed outside of said recator, said vessel being partly filled with water, first conduit means connecting said pressure vessel with the inlets of said tubular passages, second conduit means connecting the outlets of said tubular passages with said pressure vessel, thus forming a closed circuit path through said tubular passages and back to the said closed vessel, a steam pump to drive said pump, said pump regulatably moving saturated steam from said closed vessel through said tubular passage means and back to said vessel, thus transferring nuclear heat from the fuel assemblies to the saturated steam, the resulting superheated steam being desuperheated on re-entry to said vessel by contact with the water in said vessel thereby evaporating some of the water in said vessel, third conduit means branching off superheated steam from said second conduit means and connecting it to the high-pressure inlet of said steam turbine, fourth conduit means connecting a first intermediate pressure stage of said turbine leading the partly expanded steam to re-enter said turbine at an intermediate turbine stage of lower pressure than said first intermediate stage for further expansion in the turbine, convection type heat exchanger means interposed on the heating side in said second conduit means at a point between the outlets from the tubular passages of the reactor and the inlet to said pressure vessel, the heated side of said heat exchanger being interposed in said third conduit means for reheating the steam issuing from the first intermediate turbine stage by the superheated steam, thereby reducing partly the superheat of the steam in the second conduit means before it enters the pressure vessel, fifth conduit means with interposed pumping means leading the condensate from the condenser back into said pressure vessel, valved further conduit means by-passing the heating side of said heat exchanger for regulating the steam quantity flowing through the second conduit means and for regulating the temperature to which steam is reheated in said heat exchanger, temperature sensing means in said second conduit means at a point near the outlets from said tubular passages, and means for controlling the valve in said further conduit means in response to changes in the steam temperature in said second conduit means indicated by said temperature sensing means.

References Cited by the Examiner

UNITED STATES PATENTS

| | | | |
|---|---|---|---|
| 2,998,363 | 8/61 | Blaser | 176—56 |
| 3,047,479 | 7/62 | Young et al. | 176—53 |

FOREIGN PATENTS 797,725  7/58  Great Britain.

CARL D. QUARFORTH, *Primary Examiner.*

REUBEN EPSTEIN, *Examiner.*